(12) United States Patent
Wobak et al.

(10) Patent No.: US 10,945,210 B2
(45) Date of Patent: Mar. 9, 2021

(54) CONTROL SYSTEM FOR A RADIO FREQUENCY COMMUNICATION DEVICE

(71) Applicant: NXP B.V., Eindhoven (NL)

(72) Inventors: Markus Wobak, Graz (AT); Marc Lambert, May sur Orne (FR); Ulrich Neffe, Albersdorf-Prebuch (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/736,426

(22) Filed: Jan. 7, 2020

(65) Prior Publication Data

US 2020/0229091 A1    Jul. 16, 2020

(30) Foreign Application Priority Data

Jan. 10, 2019  (EP) .................................... 19305034

(51) Int. Cl.
| | | |
|---|---|---|
| H04W 52/02 | (2009.01) | |
| H04W 8/00 | (2009.01) | |
| H04L 12/10 | (2006.01) | |
| H04B 5/00 | (2006.01) | |

(52) U.S. Cl.
CPC ....... H04W 52/0229 (2013.01); H04W 8/005 (2013.01)

(58) Field of Classification Search
CPC . H04W 52/0229; H04W 8/005; H04W 52/00; H04W 52/02
USPC ...................................................... 455/41.1
See application file for complete search history.

(56) References Cited

U.S. PATENT DOCUMENTS

| | | | | |
|---|---|---|---|---|
| 8,140,010 | B2* | 3/2012 | Symons | ............... H04B 5/0075 |
| | | | | 455/41.1 |
| 9,411,993 | B2* | 8/2016 | Jonely | ................ G06K 7/10207 |
| 2012/0077434 | A1 | 3/2012 | Royston | |
| 2012/0270499 | A1* | 10/2012 | Wilson | ............... G06K 19/0723 |
| | | | | 455/41.1 |

(Continued)

FOREIGN PATENT DOCUMENTS

| | | | | |
|---|---|---|---|---|
| CN | 109495957 | A | * | 3/2019 |
| CN | 110140310 | A | * | 8/2019 ........... H04L 5/0091 |
| CN | 110519832 | A | * | 11/2019 |

*Primary Examiner* — Mohammed Rachedine

(57) ABSTRACT

In accordance with a first aspect of the present disclosure, a control system for a radio frequency (RF) communication device is provided, the system comprising: a communication controller configured to control an RF communication of the RF communication device; a detector configured to detect the presence of an external communication device and to initiate a wake-up of the communication controller in dependence on said presence; wherein the detector is configured to detect said presence by detecting a first load on an RF interface of the RF communication device, said first load resulting from a first transmitted RF pulse; and wherein the detector is configured to initiate said wake-up if a difference between the first load and a reference load is above a high threshold, and to perform a presence verification if the difference between the first load and the reference load is between a low threshold and the high threshold. In accordance with further aspects of the present disclosure, a corresponding method for controlling a radio frequency (RF) communication device is conceived, and a corresponding computer program is provided.

18 Claims, 10 Drawing Sheets

(56) References Cited

U.S. PATENT DOCUMENTS

| | | |
|---|---|---|
| 2013/0203347 A1 | 8/2013 | Moosavi |
| 2013/0335200 A1* | 12/2013 | Jonely ................ G06K 7/10207 340/10.5 |
| 2016/0182127 A1 | 6/2016 | Karandikar et al. |
| 2016/0342820 A1* | 11/2016 | Jonely ................ G06K 7/10207 |
| 2019/0190255 A1* | 6/2019 | Illing .................... H02H 3/087 |

* cited by examiner

CONTROL SYSTEM FOR A RADIO FREQUENCY COMMUNICATION DEVICE

CROSS-REFERENCE TO RELATED APPLICATIONS

This application claims priority under 35 U.S.C. § 119 to European Patent Application No. 19305034.1, filed on Jan. 10, 2019, the contents of which are incorporated by reference herein.

TECHNICAL FIELD

The present disclosure relates to a control system for a radio frequency (RF) communication device. Furthermore, the present disclosure relates to a corresponding method for controlling an RF communication device. In addition, the present disclosure relates to a corresponding computer program for carrying out the method.

BACKGROUND

Radio frequency (RF) communication devices are widely used. Examples of RF communication devices are near field communication (NFC) devices and radio frequency identification (RFID) devices. Typically, an NFC system or an RFID system includes a reader device—sometimes referred to as a "reader" or as an "interrogator"—which generates a high-frequency radio field, and a passive or active communication counterpart. The communication counterpart may be a passive transponder or an active card emulation device, for example. The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

A primary device, i.e. a reader, should normally enable its RF field and poll for counterparts in all different communication technologies (such as NFC-A, NFC-B, NFCF, NFC-V) to detect communication counterparts. Especially for battery-powered devices (e.g. mobile devices, wearables, door lock readers) this is not efficient and reduces device availability due to power limitations. Therefore, a technique called Low Power Card Detection (LPCD) may be applied, which extends the battery lifetime by using short RF sense pulses to detect load changes at the RF interface of the reader. This allows the reader to reduce its RF field ON-duration and to switch to a power-saving state between the sense pulses (e.g. to enter a current-saving standby mode).

SUMMARY

In accordance with a first aspect of the present disclosure, a control system for a radio frequency (RF) communication device is provided, the system comprising: a communication controller configured to control an RF communication device; a detector configured to detect the presence of an external communication device and to initiate a wake-up of the communication controller in dependence on said presence; wherein the detector is configured to detect said presence by detecting a first load on an RF interface of the RF communication device, said first load resulting from a first transmitted RF pulse; and wherein the detector is configured to initiate said wake-up if a difference between the first load and a reference load is above a high threshold, and to perform a presence verification if the difference between the first load and the reference load is between a low threshold and the high threshold.

In an embodiment, performing the presence verification comprises transmitting a second RF pulse and comparing a second load, which results from the second RF pulse, with the first load.

In an embodiment, performing the presence verification comprises comparing a difference between the first load and the second load with a difference threshold and concluding that the external communication device is present if the difference between the first load and the second load exceeds the difference threshold.

In an embodiment, the detector is further configured to initiate a wake-up of the communication controller in response to concluding that the external communication device is present.

In an embodiment, the detector is further configured to conclude that the external communication device is not present if the difference between the first load and the second load does not exceed the difference threshold.

In an embodiment, the detector is further configured to not initiate said wake-up and to remain in a poll state in response to concluding that the external communication device is not present.

In an embodiment, the low threshold, the high threshold and the difference threshold are configurable parameters.

In an embodiment, the configurable parameters are stored in a non-volatile memory of the RF communication device.

In an embodiment, the detector is configured to transition to a presence verification state before performing the presence verification.

In an embodiment, the detector is further configured to subtract a reference tracking value from the difference between the first load and the reference load, before said difference is compared to the high threshold and the low threshold.

In an embodiment, a RF communication device comprises a control system of the kind set forth.

In an embodiment, the RF communication device is at least one of a near field communication (NFC) device, a radio frequency identification (RFID) device, a mobile device, and a wearable device.

In accordance with a second aspect of the present disclosure, a method for controlling a radio frequency (RF) communication device is conceived, the method comprising: detecting, by a detector of the RF communication device, the presence of an external communication device by detecting a first load on an RF interface of the RF communication device, said first load resulting from a first transmitted RF pulse; initiating, by said detector, a wake-up of a communication controller of the RF communication device if a difference between the first load and a reference load is above a high threshold, and performing a presence verification if the difference between the first load and the reference load is between a low threshold and the high threshold.

In accordance with a third aspect of the present disclosure, a computer program comprises executable instructions that, when executed, carry out a method of the kind set forth.

In an embodiment, a non-transitory computer-readable medium comprises a computer program of the kind set forth.

DESCRIPTION OF DRAWINGS

Embodiments will be described in more detail with reference to the appended drawings, in which.

DESCRIPTION OF EMBODIMENTS

Radio frequency (RF) communication devices are widely used. Examples of RF communication devices are near field communication (NFC) devices and radio frequency identification (RFID) devices. Typically, an NFC system or an RFID system includes a reader device—sometimes referred to as a "reader" or as an "interrogator"—which generates a high-frequency radio field, and a passive or active communication counterpart. The communication counterpart may be a passive transponder or an active card emulation device, for example. The reader device emits a radio frequency field that may power the communication counterpart. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092.

A primary device, i.e. a reader, should normally enable its RF field and poll for counterparts in all different communication technologies (such as NFC-A, NFC-B, NFCF, NFC-V) to detect communication counterparts. Especially for battery-powered devices (e.g. mobile devices, wearables, door lock readers) this is not efficient and reduces device availability due to power limitations. Therefore, a technique called Low Power Card Detection (LPCD) may be applied, which extends the battery lifetime by using short RF sense pulses to detect load changes at the RF interface of the reader. This allows the reader to reduce its RF field ON-duration and to switch to a power-saving state between the sense pulses (e.g. to enter a current-saving standby mode).

It is noted that Low Power Card Detection (LPCD) may also be referred to, in a more generic sense, as Lower Power Device Detection (LPDD). In other words, the low-power detection techniques as described herein may not only be applied to systems in which physical or virtual smart cards should be detected, for example, but also to systems in which other types of devices should be detected, for example radio frequency identification (RFID) tags or near field communication (NFC) tags.

Figure 1:
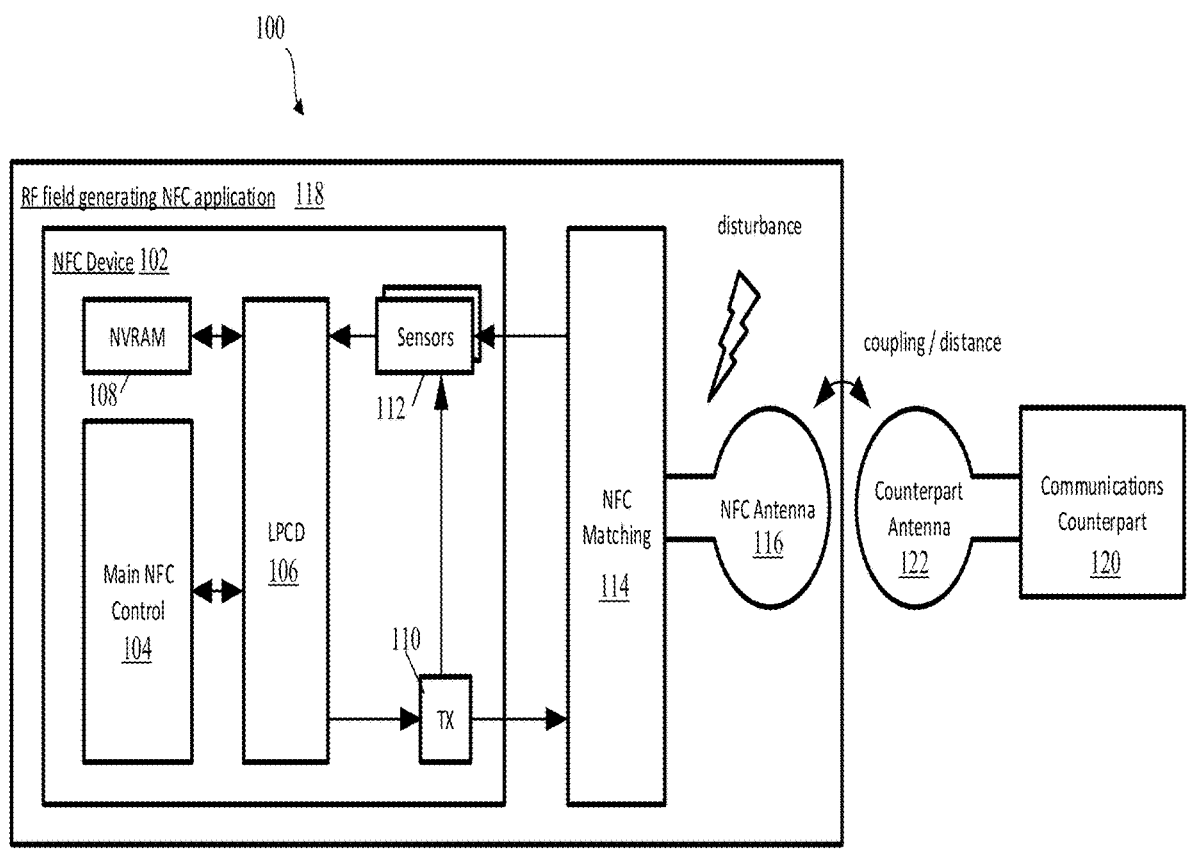
FIG. 1 shows an example of an NFC system.

FIG. 1 shows an example of an NFC system 100. The system 100 comprises a reader and a communication counterpart 120. The reader comprises an NFC device 102 operatively coupled to an NFC matching circuit 114 and an NFC antenna 116. The NFC device 102 contains both a main NFC controller 104 and a low-power card detection (LPCD) controller (referred to as a "detector" in short). The detector can be based on software and/or on a hardware state machine. In operation, the reader—more specifically the detector—emits a short RF pulse through a transmitter 110 of the reader and senses load information from the transmitter 110 (for example a transmitter current) or from the NFC matching circuit 114 by means of one or more sensors 112 (for example a receiver voltage or antenna voltage). LPCD algorithms often compare the sensed result of LPCD pulses with an initial reference measurement (i.e. an initial load value). In case of detecting a load change larger than a configured threshold, the detector triggers a wake up (WKUP) by transmitting a wake-up signal to the main NFC controller, for example. The reference measurement, detection thresholds and further parameters used by the algorithm can be saved in a non-volatile random-access memory (NVRAM) or in a flash memory.

Implementations of the LPCD algorithm often rely on having a constant or very slowly changing sensor output if no load is present. In other words, it is assumed that only an approaching antenna detuning device—e.g. a communication counterpart, such as a card or a tag—can cause a sensor output change. This allows using a detection threshold to detect a load change caused by an approaching communication counterpart reliably. Having a large LPCD detection range or enabling applications with weak coupling antennas requires using low detection thresholds, which are slightly above the intrinsic measurement noise. This can often be the case for NFC implementations in mobile phones or wearable devices. Such devices often include several radios (e.g. cellular, Wi-Fi, Bluetooth, GPS, GLONASS) operating in parallel and tightly packed modules in one package. Even radios operating at different radio bands can have a detuning effect to sensitive LPCD implementations. Other radios running in parallel are operating without being correlated to the operation of the NFC or RFID radio.

Unfortunately, conventional LPCD algorithms do not consider that switching may take place due to disturbances, which are caused for example by other radios. Such switching involves a load change which is not caused by an approaching communication counterpart, but by said disturbances. The detector may inadvertently trigger a wake up of the main communication controller if such a load change is detected. This event is referred to as a "false alarm". In particular, the radios running in parallel can cause intrinsic switching offsets in LPCD sensor data as the detected load impedance in the system is switched between several operating modes. Furthermore, sensor output data drifts caused by temperature changes can be observed depending on a radio being enabled or not. Additionally, a changing environment of a reader (e.g. having a mobile device in a pocket or not) can cause temperature changes resulting in offsets as well. The sensor output may also be affected by slow measurement uncertainty drifts.

Figure 2:
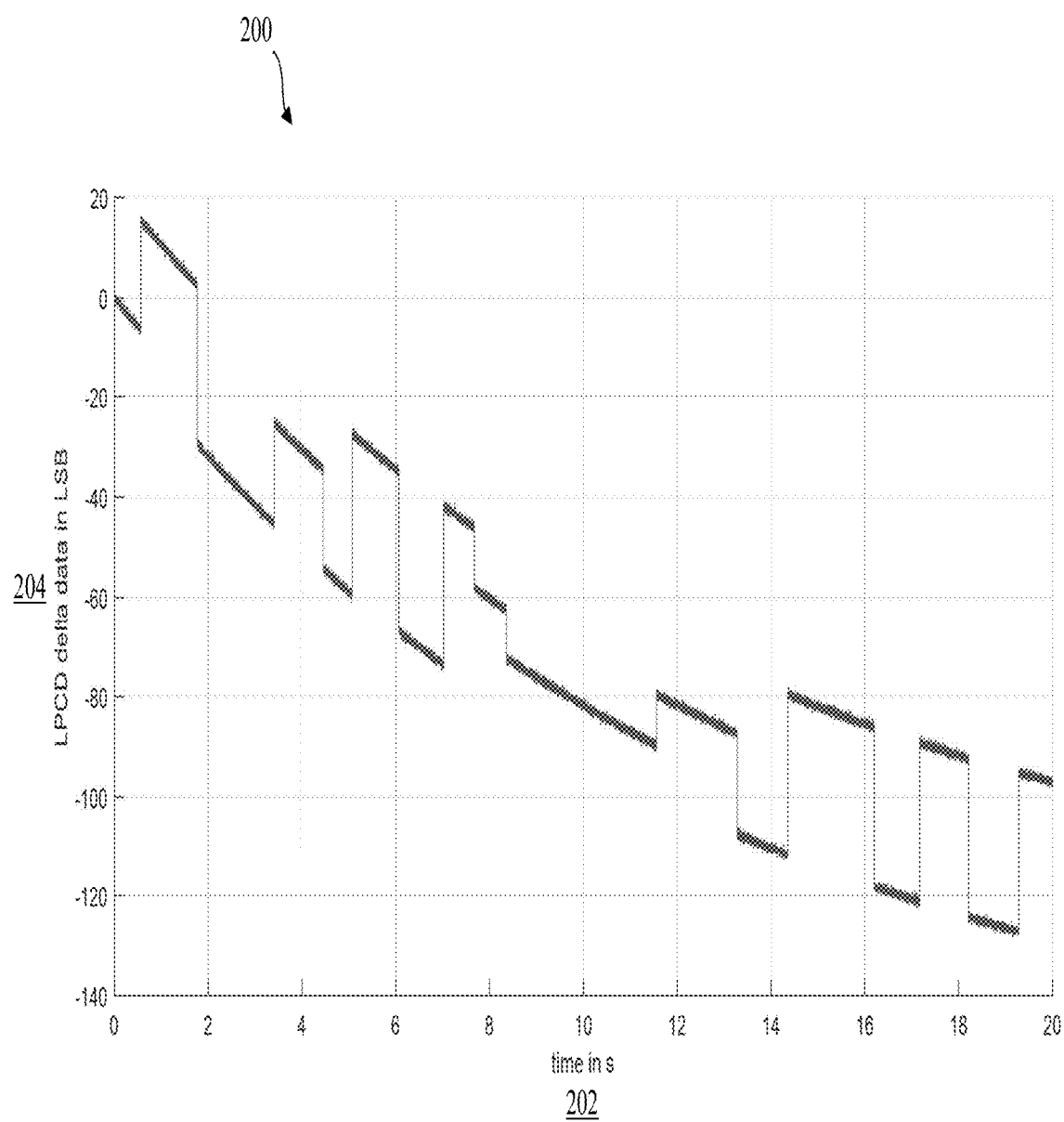
FIG. 2 shows an example of a drift of unloaded LPCD measurement data.

FIG. 2 shows an example of a drift 200 of unloaded LPCD measurement data. On the x-axis 202, the time is shown in seconds, and on the y-axis 204, the drift—i.e. LPCD delta data—is shown in LSB. It is noted that LSB (least significant bit) is the unit in which the drift is measured in this example. The LSB represents the smallest difference that can be measured with an analog-to-digital converter (ADC), for instance. It is noted that the drift can also be expressed in another unit.

In particular, FIG. 2 shows a typical drift of unloaded LPCD measurement data, i.e. a difference with an initial reference measurement, over time. The drift can be separated into a linear combination of an additive white Gaussian measurement noise, an exponential temperature drift that can occur at any moment in time, and multimodal switching offsets. In order not to trigger false alarms, high detection thresholds should be applied. This, however, significantly reduces the LPCD detection range. False alarms, in turn, increase the power consumption and may negatively affect the user experience. Now discussed are a control system and a corresponding control method that mitigate the negative effect of sensor data drifts and fast switching of adjacent or shared radio activity. This, in turn, facilitates preventing false alarms while maintaining a high LPCD detection sensitivity performance.

Therefore, in accordance with a first aspect of the present disclosure, a control system is provided for a radio frequency (RF) communication device, the system comprising: a communication controller configured to control RF communication; a detector configured to detect the presence of an external communication device and to initiate a wake-up of the communication controller in dependence on said presence; wherein the detector is configured to detect said presence by detecting a first load on an RF interface of the RF communication device, said first load resulting from a first transmitted RF pulse; and wherein the detector is configured to initiate said wake-up if a difference between the first load and a reference load is above a high threshold, and to perform a presence verification if the difference between the first load and the reference load is between a low threshold and the high threshold. In this way, large load changes will result in a wake-up of a communication controller (e.g., a main NFC controller), while smaller load changes—which are still above a low threshold but do not exceed the high threshold—will not immediately result in a wake-up, but in a presence verification step. During this step, the presence of the external communication device is verified. In other words, during this step, it is verified whether the load change is caused by the presence of an external communication device, or by disturbances such as drifts of the detector's measurement data. Thereby, false alarms may be prevented, while a high detection sensitivity of the detector can still be achieved. It is noted that, if the difference between the first load and the reference load is below the low threshold, then no wake-up of the communication controller is triggered, and no presence verification step is performed either. In that case, the detector may remain in a polling state, in which it will periodically transmit RF pulses, until one of these pulses results in a load change that is above the low threshold. The reference load may be an initial reference measurement value (i.e. an initial load value) as used in conventional LPCD algorithms.

Figure 3:
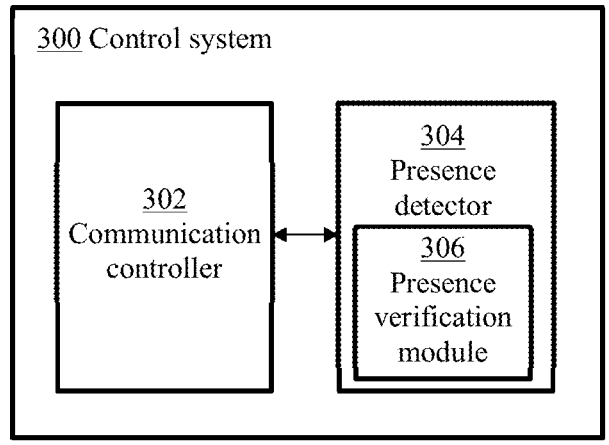
FIG. 3 shows an illustrative embodiment of a control system.

FIG. 3 shows an illustrative embodiment of a control system 300. The system 300 comprises a communication controller 302 that is operatively coupled to a presence detector 304. The communication controller 302 may be a main NFC controller, for example. The presence detector 304 may for example be a low-power card detector (LPCD), a low-power tag detector (LPTD), or—in more generic terms—a low-power device detector (LPDD).

Figure 4:
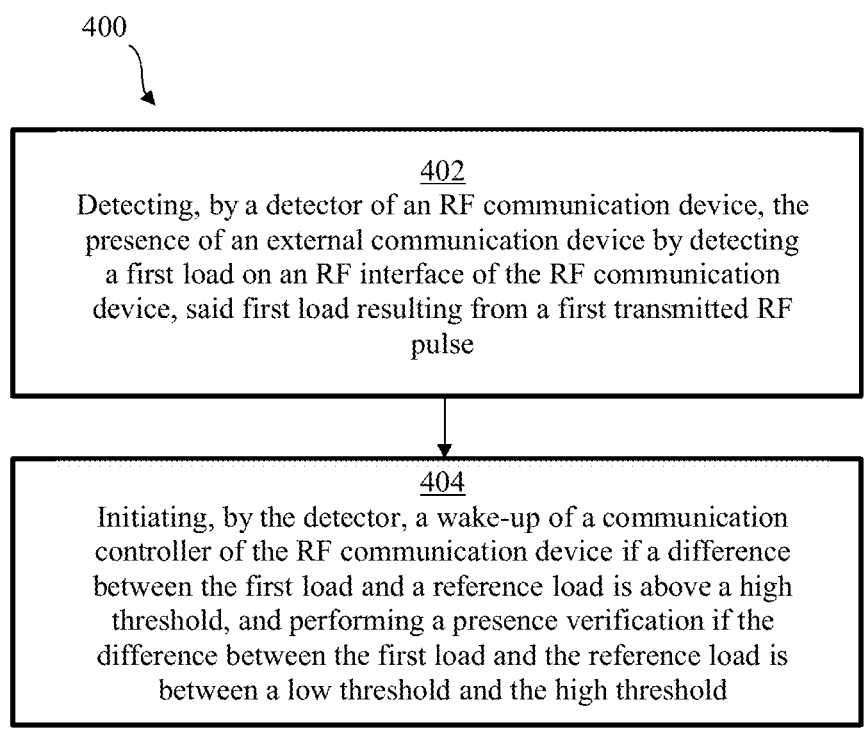
FIG. 4 shows an illustrative embodiment of a control method.

FIG. 4 shows an illustrative embodiment of a corresponding control method 400. The method 400 may at least partially be implemented as a computer program. The method 400 comprises the following steps: at 402, detecting, by a detector of an RF communication device, the presence of an external communication device by detecting a first load on an RF interface of the RF communication device, said first load resulting from a first transmitted RF pulse, and at 404, initiating, by the detector, a wake-up of a communication controller of the RF communication device if a difference between the first load and a reference load is above a high threshold, and performing a presence verification if the difference between the first load and the reference load is between a low threshold and the high threshold.

In an embodiment, performing the presence verification comprises transmitting a second RF pulse and comparing a second load, which results from the second RF pulse, with the first load. In this way, the presence of an external communication device (i.e., a communication counterpart) can easily be verified. Furthermore, in an embodiment, performing the presence verification comprises comparing a difference between the first load and the second load with a difference threshold and concluding that the external communication device is present if the difference exceeds the difference threshold. This results in a practical and effective implementation of the presence verification. This embodiment is based on the assumption that the load change over time will be significant if it is caused by an approaching communication counterpart, or, in other words, that the load change is continuous if it is caused by an approaching communication counterpart.

Figure 5:
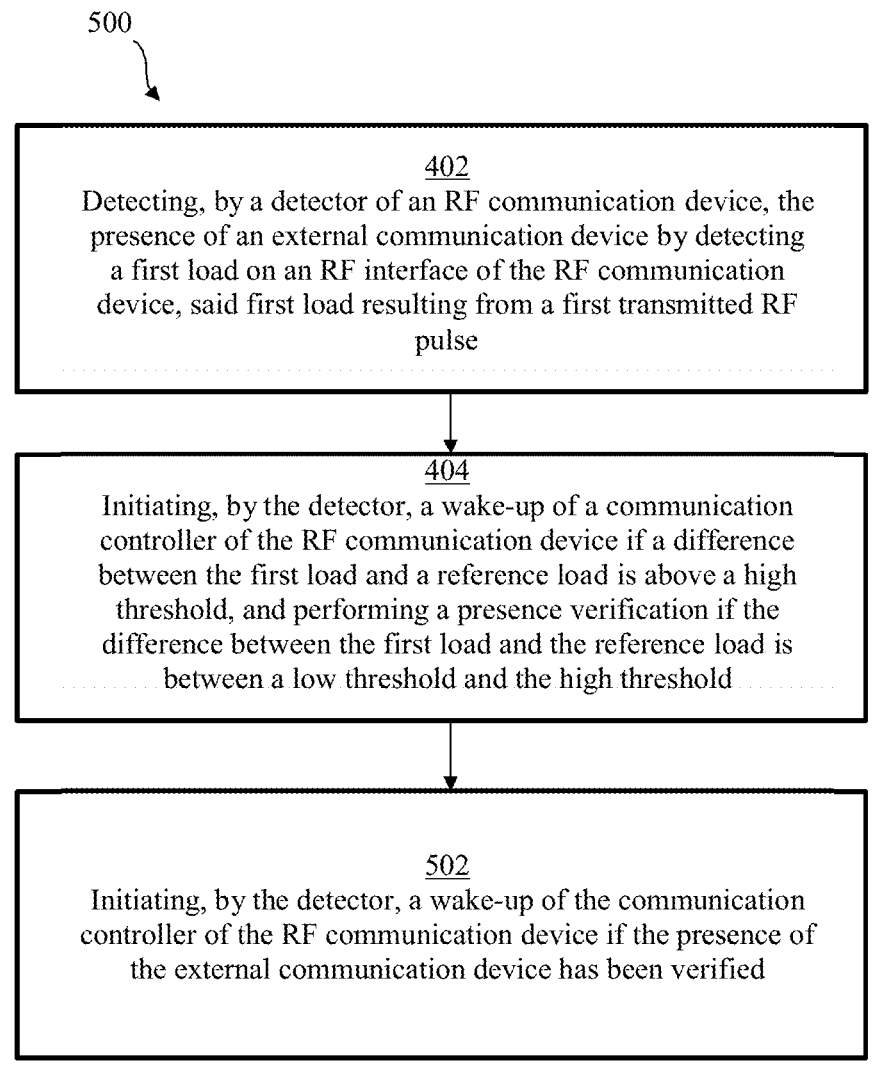
FIG. 5 shows another illustrative embodiment of a control method.

FIG. 5 shows another illustrative embodiment of a control method 500. The method 500 comprises, in addition to the steps already shown in FIG. 4, a step 502 of initiating, by the detector, a wake-up of the communication controller of the RF communication device if the presence of the external communication device has been verified. Accordingly, in an embodiment, the detector is further configured to initiate a wake-up of the communication controller in response to concluding that the external communication device is present. In this way, the communication controller can still be woken up, provided that its presence has been verified. After the wake-up, the communication controller can establish and control RF communication with the external communication device.

In an embodiment, the detector is further configured to conclude that the external communication device is not present if the difference does not exceed the difference threshold. This facilitates avoiding that the communication controller is woken up if no external communication device is present. This embodiment is based on the assumption that the load will not vary much over time if it is caused by disturbances. In other words, a small load change is indicative of a step-like load change, which is characteristic for disturbances, while a larger load change is indicative of a continuous load change, which is characteristic for an approaching communication counterpart.

Figure 6:
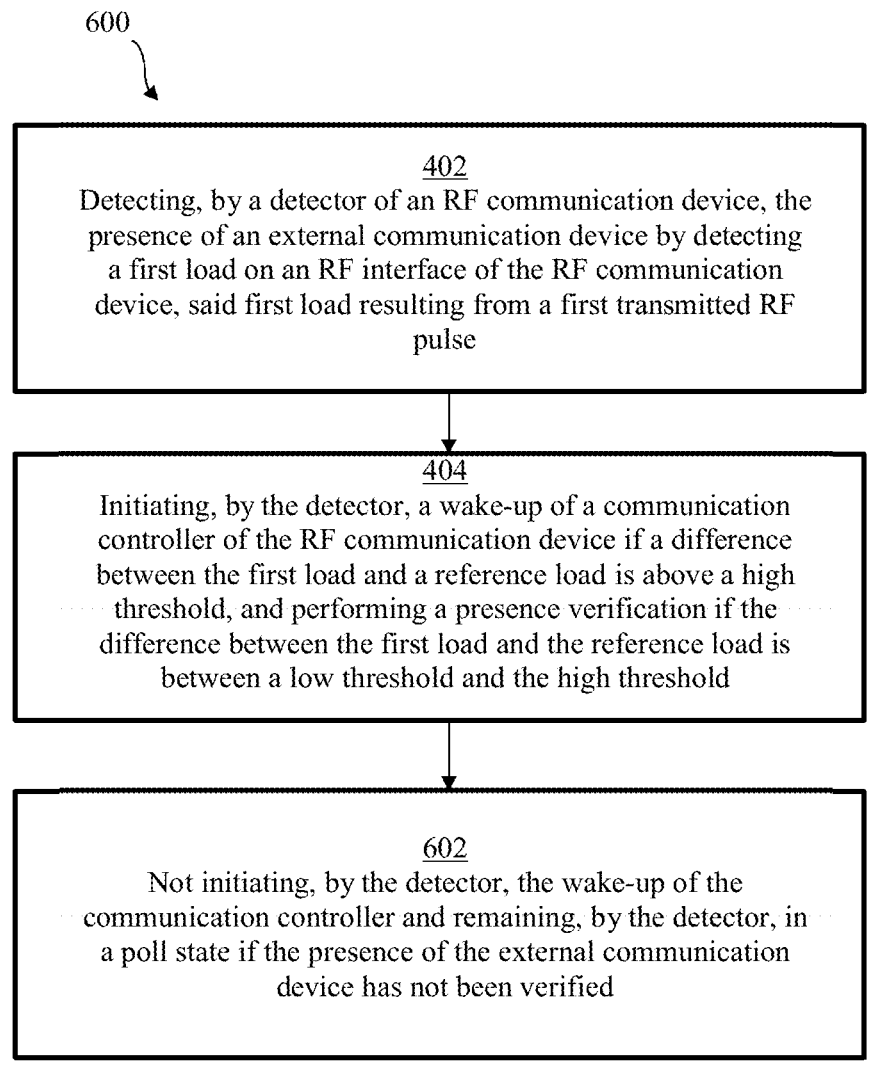
FIG. 6 shows a further illustrative embodiment of a control method.

FIG. 6 shows a further illustrative embodiment of a control method 600. The method 600 comprises, in addition to the steps already shown in FIG. 4, a step 602 of not initiating, by the detector, the wake-up of the communication controller and remaining, by the detector, in a poll state if the presence of the external communication device has not been verified. Accordingly, in an embodiment, the detector is further configured to not initiate the wake-up and to remain in a poll state in response to concluding that the external communication device is not present. In this way, the detector keeps polling—i.e. transmitting RF pulses—to detect the presence or likely presence of an external communication device. Subsequently, if a transmitted RF pulse again results in a load change above the high threshold, it is assumed that an external communication device is present, and the communication controller is woken up. However, if a transmitted RF pulse results in a load change between the low threshold and the high threshold, it is assumed that an external communication device is likely present, and the presence verification is performed again.

In an embodiment, the low threshold, the high threshold and the difference threshold are configurable parameters. In this way, the thresholds can easily be adapted, which increases the flexibility of the control system. In a practical and effective implementation, the configurable parameters are stored in a non-volatile memory of the RF communication device. Table 1 shows examples of configurable parameters of the kind set forth. In table 1, the high threshold is referred to as th_coarse, the low threshold is referred to as th_fine, and the difference threshold is referred to as th_switch.

TABLE 1

| Parameter | Description |
| --- | --- |
| th_coarse | Unsigned integer threshold in LSB defining the high threshold triggering immediate wake up. |
| th_fine | Unsigned integer threshold in LSB defining the low threshold triggering an initial switching check. May also be used to trigger slow movement wake up trigger. |
| th_switch | Unsigned integer threshold in LSB defining the threshold used to detect load switching. |

In an embodiment, the detector is configured to transition to a presence verification state before performing the presence verification. This facilitates increasing the efficiency of the algorithm. The presence verification state is referred to as the CHECK_SWITCH state in FIG. 8A. The detector may also operate in other states, which will be explained in more detail with reference to FIG. 8A. It is noted that the detector may, at least partially, be implemented as a software module containing instructions that carry out the LPCD algorithm.

Figure 7A:
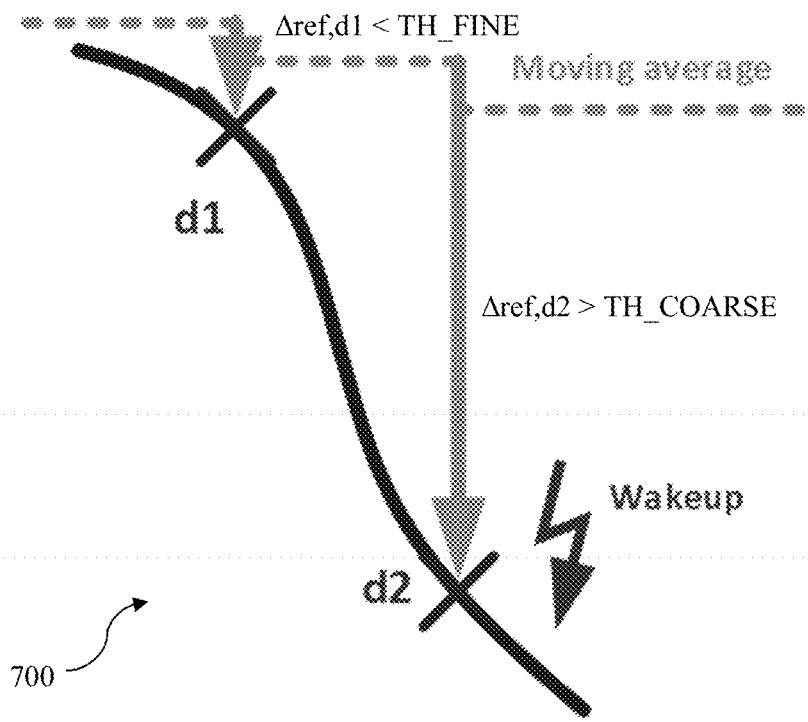
FIG. 7A shows an illustrative embodiment of a device detection.

FIG. 7A shows an illustrative embodiment of a device detection 700. In this example embodiment, a load change Δref,d2 resulting from a transmitted RF pulse exceeds the high threshold th_coarse. Accordingly, the detector initiates a wake-up of the main communication controller of the RF communication device. In other words, this fast load change triggers an immediate wake-up of the communication controller, and no presence verification is performed.

Figure 7B:
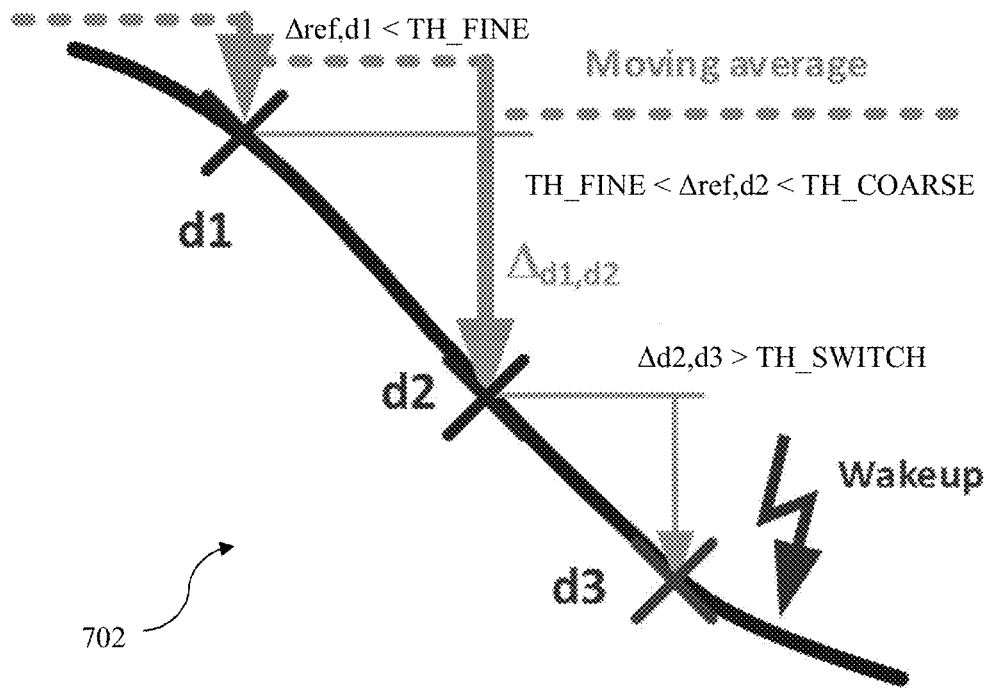
FIG. 7B shows an illustrative embodiment of a presence verification.

FIG. 7B shows an illustrative embodiment of a presence verification 702. In this example embodiment, a load change Δref,d2 resulting from a transmitted RF pulse exceeds the low threshold th_fine, but it does not exceed the high threshold th_coarse. Accordingly, the detector performs a presence verification. In this embodiment, the detector performs the presence verification by transmitting another RF pulse, which results in load d3. In this case, the difference between load d3 and d2 exceeds the difference threshold th_switch. Furthermore, the difference between load d3 and d2 (Δd2,d3) has the same sign (i.e., direction) as the difference between load d2 and d1 (Δd1,d2). Accordingly, the detector initiates a wake-up of the main communication controller of the RF communication device. In other words, this slow load change triggers a presence verification. After the presence of the external communication device has been verified—which indicates a slowly approaching external communication device—a wake-up of the main communication controller is triggered.

Figure 7C:
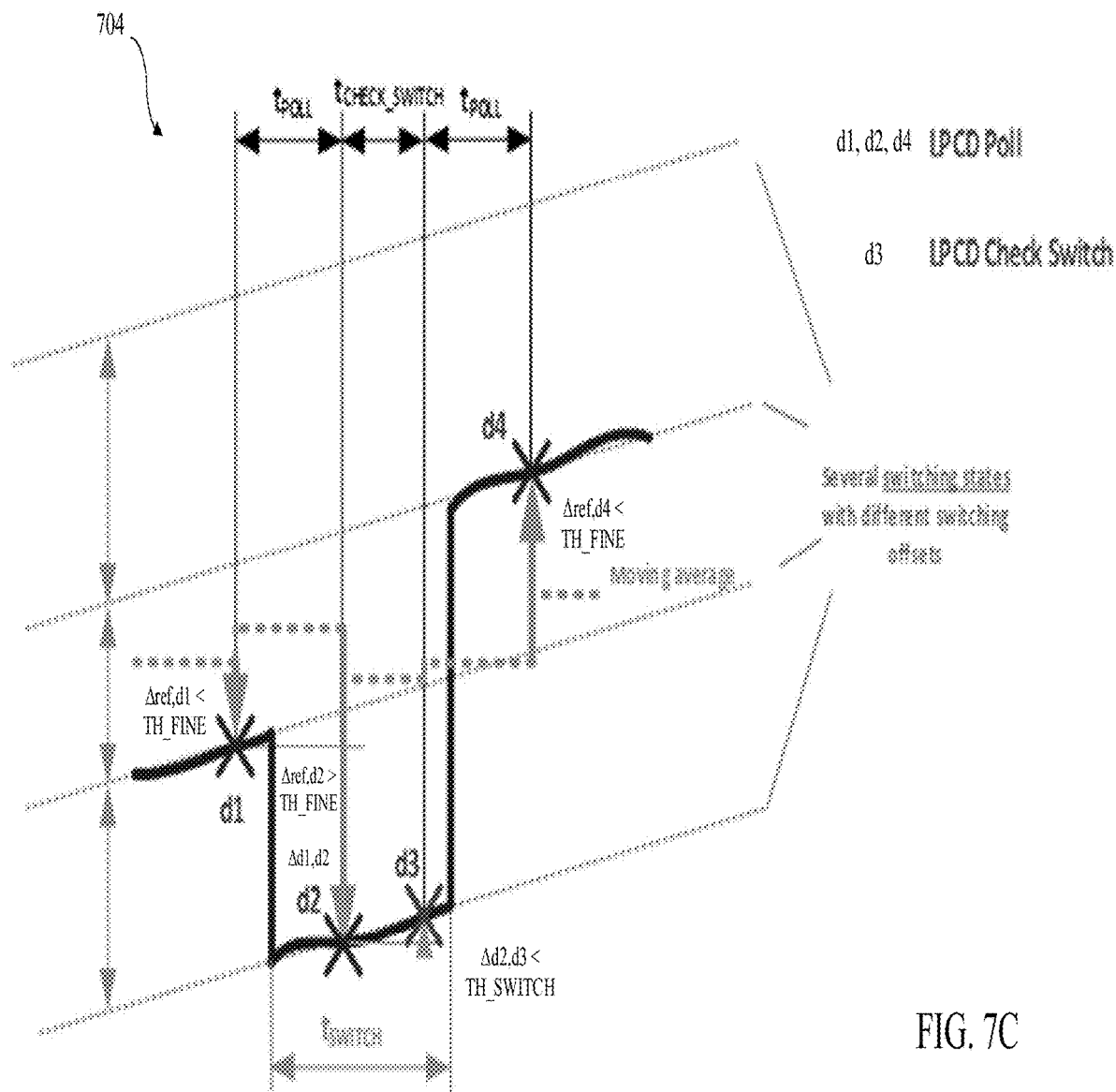
FIG. 7C shows another illustrative embodiment of a presence verification.

FIG. 7C shows another illustrative embodiment of a presence verification 704. In this example embodiment, a load change Δref,d2 resulting from a transmitted RF pulse exceeds the low threshold th_fine, but it does not exceed the high threshold th_coarse. Accordingly, the detector performs a presence verification. In this embodiment, the detector performs the presence verification by transmitting another RF pulse, which results in load d3. Since the difference between load d3 and d2 does not exceed the difference threshold th_switch it is assumed that the load change is caused by antenna switching. Accordingly, the detector does not wake up the main communication controller of the RF communication device, and keeps polling for communication counterparts.

Figure 7D:
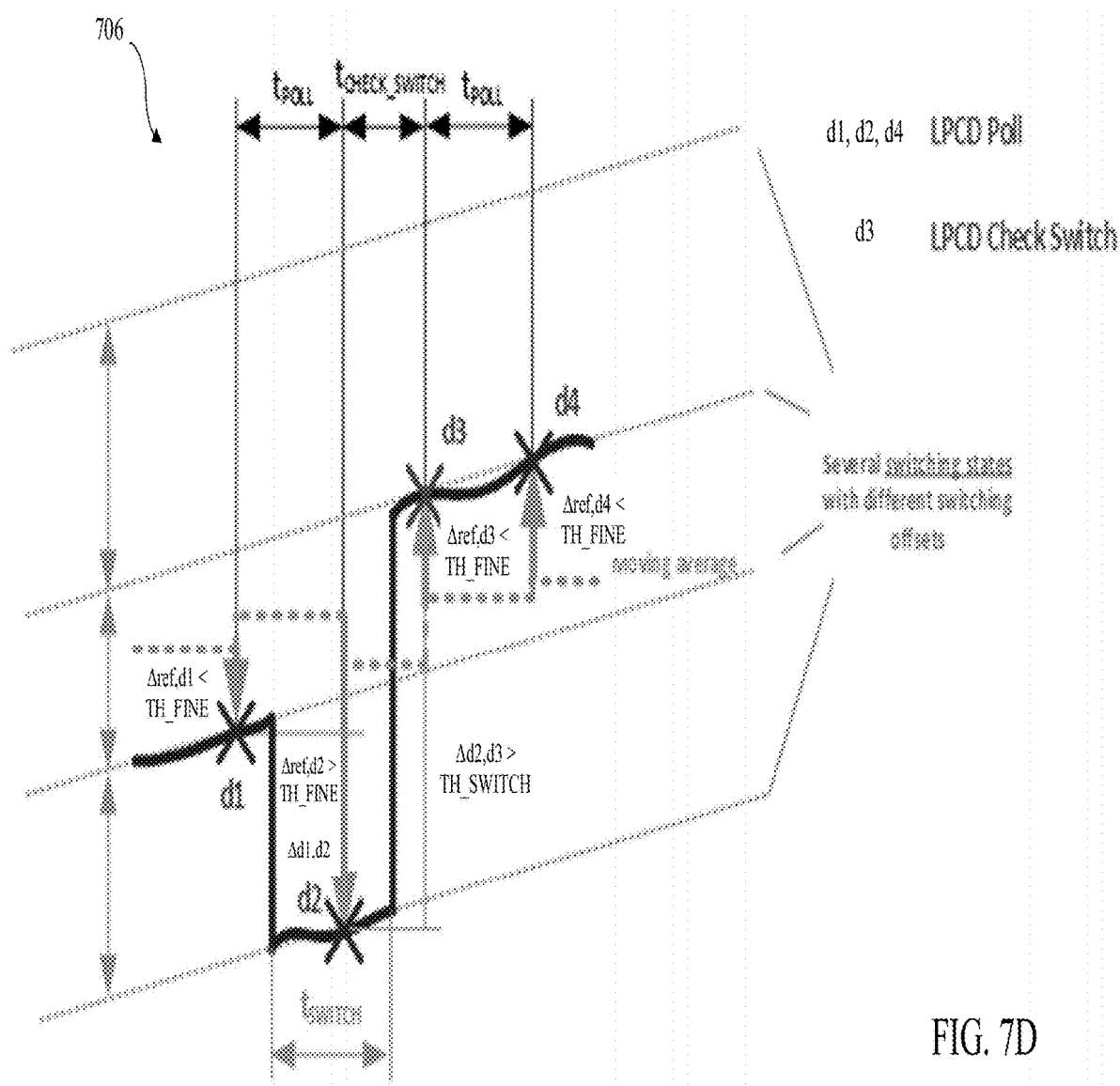
FIG. 7D shows a further illustrative embodiment of a presence verification.

FIG. 7D shows a further illustrative embodiment of a presence verification 706. In this example embodiment, the load change Δref,d2 resulting from a transmitted RF pulse again exceeds the low threshold th_fine, but it does not exceed the high threshold th_coarse. Accordingly, the detector performs a presence verification. In this example, the detector again performs this verification by transmitting another RF pulse, which results in load d3. In this case, the difference between load d3 and d2 exceeds the difference threshold th_switch. This would normally trigger a wake up of the main communication controller, but because the difference has a different sign as before, it is again assumed that the load change is caused by disturbances. Accordingly, the detector does not wake up the main communication controller of the RF communication device and keeps polling for communication counterparts.

Figure 8A:
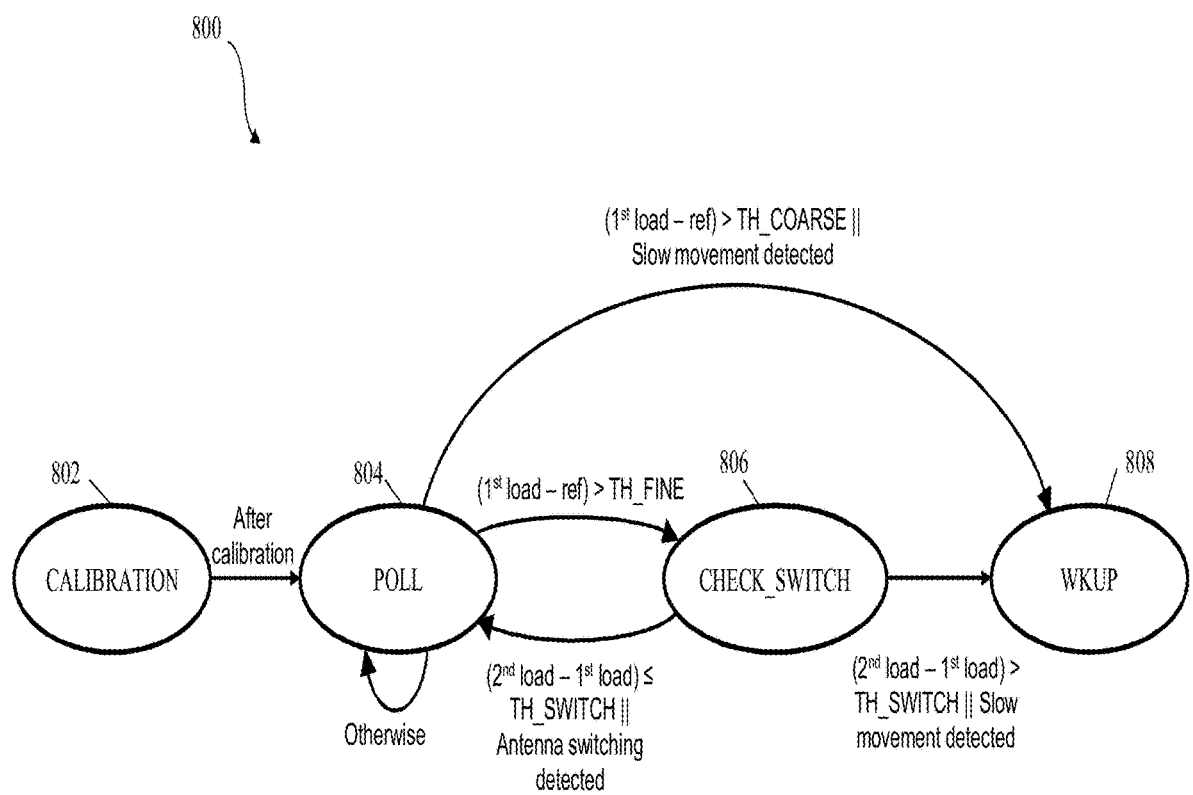
FIG. 8A shows an illustrative embodiment of LPCD detection states.

FIG. 8A shows an illustrative embodiment of LPCD detection states 800. In this example embodiment, the following detection states are distinguished: a calibration state 802, a poll state 804, a presence verification state 806 (referred to as the CHECK_SWITCH state), and a wake-up state 808. In the calibration state 802, the detector is calibrated. During this calibration, an initial reference measurement may be performed, resulting in the abovementioned reference load. In the poll state 804, the detector periodically transmits an RF pulse, to poll for communication counterparts. In the presence verification state 806, the detector verifies the presence of a communication counterpart. In the wake-up state 808, the detector wakes up the main communication controller of the RF communication device.

Figure 8B:
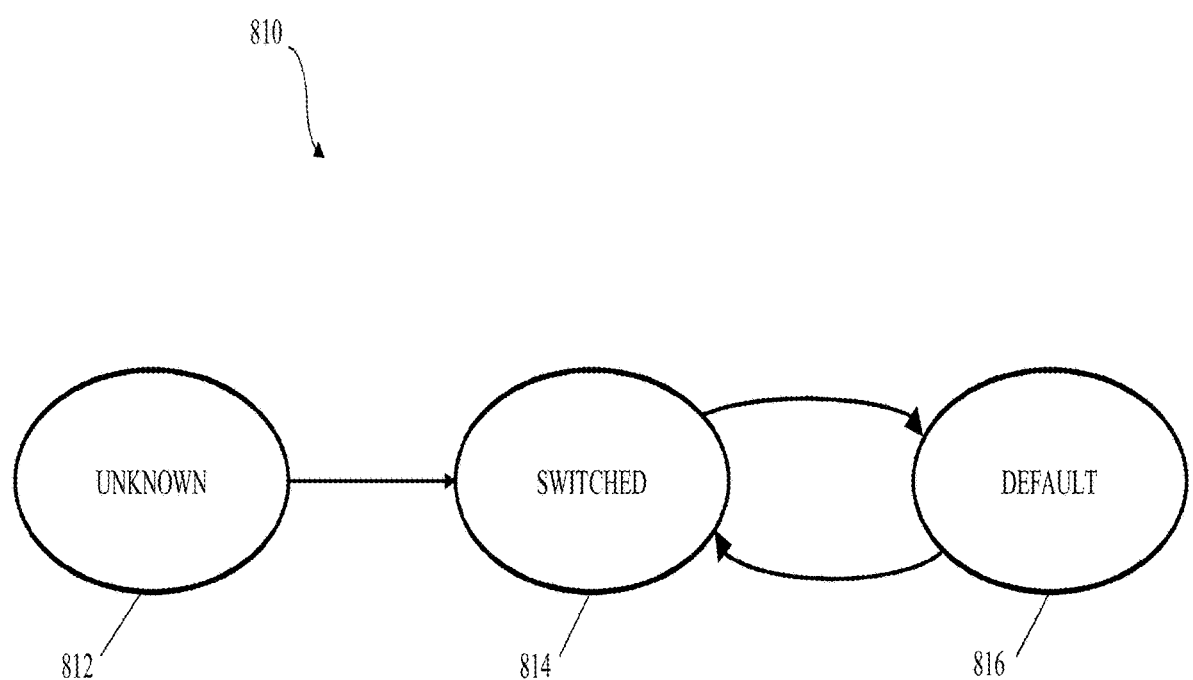
FIG. 8B shows an illustrative embodiment of antenna switching states.

FIG. 8B shows an illustrative embodiment of antenna switching states 810. In this example embodiment, the following antenna switching states are distinguished: an unknown state 812, a switched state 814, and a default state 816. In the unknown state 812, it is not known if antenna load switching takes place. In the switched state 814, it is known that antenna load switching takes place. In the default state 816, it is known that no antenna load switching takes place.

In an embodiment, the detector is further configured to subtract a reference tracking value from the difference between the first load and the reference load, before said difference is compared to the high threshold and the low threshold. In this way, the detector can compensate for slow moving changes (e.g., temperature changes) that may potentially result in wake-ups due to false alarms. In particular, very slow-moving changes such as temperature changes can cause that the difference slowly increases, even when no load change occurs due to an approaching external communication device. Reference tracking can be introduced to compensate for such slow-moving changes: a moving average filter based on the last m LPCD measurements allows to track the reference value. For example, a mean value can be generated over the last m measurements (m being for example 8 or 16). In that case, the algorithm considers a moving average of the difference over the last m measurements: reftrack$_{n,m}$=mean{[meas$_n$,meas$_{n-1}$, ... meas$_{n-m+1}$]}. The condition for wake-up may then be: abs{delta$_n$−reftrack$_{n-1,m}$}>detection_threshold, where delta$_n$ is the difference between an instantaneous measurement (at time index n) with the initial calibration measurement.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described.

It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC system
102 NFC device
104 main NFC controller
106 low-power card detector
108 non-volatile random-access memory
110 transmitter
112 sensors
114 NFC matching circuit
116 NFC antenna
118 RF field generating NFC application
120 communications counterpart
122 counterpart antenna
200 drift of unloaded LPCD measurement data
202 time in seconds
204 LPCD delta data in LSB
300 control system
302 communication controller
304 presence detector
306 presence verification module
400 control method
402 detecting, by a detector of an RF communication device, the presence of an external communication device by detecting a first load on an RF interface of the RF communication device, said first load resulting from a first transmitted RF pulse
404 initiating, by the detector, a wake-up of a communication controller of the RF communication device if a difference between the first load and a reference load is above a high threshold, and performing a presence verification if the difference between the first load and the reference load is between a low threshold and the high threshold
500 control method
502 initiating, by the detector, a wake-up of the communication controller of the RF communication device if the presence of the external communication device has been verified
600 control method
602 not initiating, by the detector, the wake-up of the communication controller and remaining, by the detector, in a poll state if the presence of the external communication device has not been verified
700 device detection
702 presence verification
704 presence verification
706 presence verification
800 LPCD detection states
802 calibration state
804 poll state
806 presence verification state
808 wake up state
810 antenna switching states
812 unknown state
814 switched state
816 default state

The invention claimed is:

1. A control system for a radio frequency, RF, communication device, the system comprising:
a communication controller configured to control an RF communication of the RF communication device;
a detector configured to detect the presence of an external communication device and to initiate a wake-up of the communication controller in dependence on said presence;
wherein the detector is configured to detect said presence by detecting a first load on an RF interface of the RF communication device, said first load resulting from a first transmitted RF pulse; and
wherein the detector is configured to initiate said wake-up if a difference between the first load and a reference load is above a high threshold, and to perform a presence verification if the difference between the first load and the reference load is between a low threshold and the high threshold, wherein performing the presence verification comprises transmitting a second RF pulse and comparing a second load, which results from the second RF pulse, with the first load.

2. The system of claim 1, wherein performing the presence verification comprises comparing a difference between the first load and the second load with a difference threshold and concluding that the external communication device is present if the difference between the first load and the second load exceeds the difference threshold.

3. The system of claim 2, wherein the detector is further configured to initiate a wake-up of the communication controller in response to concluding that the external communication device is present.

4. The system of claim 2, wherein the detector is further configured to conclude that the external communication device is not present if the difference between the first load and the second load does not exceed the difference threshold.

5. The system of claim 4, wherein the detector is further configured to not initiate said wake-up and to remain in a poll state in response to concluding that the external communication device is not present.

6. The system of claim 2, wherein the low threshold, the high threshold and the difference threshold are configurable parameters.

7. The system of claim 6, wherein the configurable parameters are stored in a non-volatile memory of the RF communication device.

8. The system of claim 1, wherein the detector is configured to transition to a presence verification state before performing the presence verification.

9. The system of claim 1, wherein the detector is further configured to subtract a reference tracking value from the difference between the first load and the reference load, before said difference is compared to the high threshold and the low threshold.

10. A radio frequency, RF, communication device comprising a control system for a radio frequency, RF, communication device, the system comprising:
a communication controller configured to control an RF communication of the RF communication device;
a detector configured to detect the presence of an external communication device and to initiate a wake-up of the communication controller in dependence on said presence;
wherein the detector is configured to detect said presence by detecting a first load on an RF interface of the RF communication device, said first load resulting from a first transmitted RF pulse; and
wherein the detector is configured to initiate said wake-up if a difference between the first load and a reference load is above a high threshold, and to perform a presence verification if the difference between the first load and the reference load is between a low threshold and the high threshold, wherein performing the presence verification comprises transmitting a second RF pulse and comparing a second load, which results from the second RF pulse, with the first load.

11. The RF communication device of claim 10, being at least one of a near field communication, NFC, device, a radio frequency identification, RFID, device, a mobile device, and a wearable device.

12. A method for controlling a radio frequency, RF, communication device, the method comprising:
detecting, by a detector of the RF communication device, the presence of an external communication device by detecting a first load on an RF interface of the RF communication device, said first load resulting from a first transmitted RF pulse;
initiating, by said detector, a wake-up of a communication controller of the RF communication device if a difference between the first load and a reference load is above a high threshold and performing a presence verification if the difference between the first load and the reference load is between a low threshold and the high threshold, wherein performing the presence verification comprises transmitting a second RF pulse and comparing a second load, which results from the second RF pulse, with the first load.

13. The method of claim 12, wherein performing the presence verification comprises comparing a difference between the first load and the second load with a difference threshold and concluding that the external communication device is present if the difference between the first load and the second load exceeds the difference threshold.

14. The method of claim 13, wherein the detector initiates a wake-up of the communication controller in response to concluding that the external communication device is present.

15. The method of claim 12, wherein the detector concludes that the external communication device is not present if the difference between the first load and the second load does not exceed the difference threshold.

16. The method of claim 15, wherein the detector does not initiate said wake-up and remains in a poll state in response to concluding that the external communication device is not present.

17. The method of claim 12, wherein the method is carried out by a computer program comprising executable instructions.

18. The method of claim 17, wherein the computer program is stored on a non-transitory computer-readable medium.

\* \* \* \* \*